US010827195B2

(12) United States Patent
Ye et al.

(10) Patent No.: US 10,827,195 B2
(45) Date of Patent: Nov. 3, 2020

(54) METHOD AND APPARATUS FOR UNIFYING ADJACENT MERGE CANDIDATES AND NON-ADJACENT MERGE CANDIDATES

(71) Applicant: Tencent America LLC, Palo Alto, CA (US)

(72) Inventors: Jing Ye, San Jose, CA (US); Shan Liu, San Jose, CA (US); Xiang Li, Los Gatos, CA (US); Guichun Li, Milpitas, CA (US); Xiaozhong Xu, State College, PA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/440,315

(22) Filed: Jun. 13, 2019

(65) Prior Publication Data

US 2020/0045328 A1     Feb. 6, 2020

Related U.S. Application Data

(60) Provisional application No. 62/714,552, filed on Aug. 3, 2018, provisional application No. 62/735,818, filed on Sep. 24, 2018.

(51) Int. Cl.
*H04N 19/557* (2014.01)
*H04N 19/57* (2014.01)
(Continued)

(52) U.S. Cl.
CPC ........... *H04N 19/513* (2014.11); *H04N 19/44* (2014.11); *H04N 19/557* (2014.11); *H04N 19/57* (2014.11)

(58) Field of Classification Search
CPC ............................. H04N 19/44; H04N 19/513
(Continued)

(56) References Cited

U.S. PATENT DOCUMENTS 10,397,600 B1 * 8/2019 Xu ............................ G06T 9/00
10,523,963 B1 * 12/2019 Ye .......................... H04N 19/96
(Continued)

OTHER PUBLICATIONS

High Efficiency Video Coding (HEVC), Rec. ITU-T H.265, International Telecommunication Union, and ISO/IEC 23008-2, Dec. 2016.
(Continued)

*Primary Examiner* — James T Boylan
(74) *Attorney, Agent, or Firm* — Oblon, McClelland, Maier & Neustadt, L.L.P.

(57) ABSTRACT

An apparatus for video decoding includes receiving circuitry and processing circuitry. The processing circuitry decodes prediction information for a current block in a current picture from a coded video bitstream, the prediction information being indicative of a prediction mode that is based on an expanded motion vector candidate list. The processing circuitry expands the current block to generate an expanded block by iteratively (i) increasing a width of the current block by a first grid size and (ii) increasing a height of the current block by a second grid size until a number of iterations is equal to a value indicative of a maximum search round. The processing circuitry searches and locates, in the expanded block, a plurality of blocks and constructs, in response to the prediction mode, the expanded motion vector candidate list.

23 Claims, 13 Drawing Sheets

(51) Int. Cl.
    *H04N 19/513*    (2014.01)
    *H04N 19/44*    (2014.01)
(58) Field of Classification Search
    USPC .................................................. 375/240.16
    See application file for complete search history.

(56) References Cited

U.S. PATENT DOCUMENTS

| | | | |
|---|---|---|---|
| 10,587,885 B2* | 3/2020 | Ye .......................... | H04N 19/52 |
| 2018/0098063 A1* | 4/2018 | Chen ...................... | H04N 19/52 |
| 2018/0359483 A1* | 12/2018 | Chen ...................... | H04N 19/44 |
| 2019/0116376 A1* | 4/2019 | Chen ..................... | H04N 19/176 |
| 2020/0007889 A1* | 1/2020 | Chao .................... | H04N 19/176 |

OTHER PUBLICATIONS

B. Bross, J. Chen, S. Liu, "Versatile Video Coding (Draft 2)", ISO/IEC JTC1/SC29/WG11 JVET-K1001, Jul. 2018.

Jingning Han, Yaowu Xu, James Bankoski , "A dynamic motion vector referencing scheme for video coding", Sep. 2016, ICIP.

J. Ye, X. Li, S. Liu , "CE4: Additional merge candidates (Test Apr. 2, 2013)" , Jul. 2018, Ljubljana, Slovenia.

X. Li, X. Xu, X. Zhao, J. Ye, L. Zhao, S. Liu, "Description of SDR video coding technology proposal by Tencent", JVET-J0029, Apr. 2018, San Diego.

J. Ye, X. Li, S. Liu, "Merge mode modification on top of Tencent's software in response to CfP", JVET-J0058, Apr. 2018, San Diego.

\* cited by examiner

METHOD AND APPARATUS FOR UNIFYING ADJACENT MERGE CANDIDATES AND NON-ADJACENT MERGE CANDIDATES

INCORPORATION BY REFERENCE

This present disclosure claims the benefit of U.S. Provisional Application No. 62/714,552, "Unify adjacent merge candidates and non-adjacent merge candidates" filed on Aug. 3, 2018, and U.S. Provisional Application No. 62/735,818, "Methods for Extended Candidate Search in Merge and AMVP in Video Coding" filed on Sep. 24, 2018. The entire disclosures of the prior applications are incorporated herein by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry decodes prediction information for a current block in a current picture from a coded video bitstream, the prediction information being indicative of a prediction mode that is based on an expanded motion vector candidate list. The processing circuitry expands the current block to generate an expanded block by iteratively (i) increasing a width of the current block by a first grid size and (ii) increasing a height of the current block by a second grid size until a number of iterations is equal to a value indicative of a maximum search round. The processing circuitry searches and locates, in the expanded block, a plurality of blocks including a top left block, an above middle block, a top right block, a left middle block, and a bottom left block that are not adjacent to neighboring blocks of the current block. The processing circuitry further constructs, in response to the prediction mode, the expanded motion vector candidate list that includes at least an adjacent motion vector candidate which is an adjacent neighboring block of the current block and a non-adjacent motion vector candidate which is a block from the plurality of blocks located in the expanded block that is non-adjacent to the current block.

According to an aspect of the disclosure, the processing circuitry further expands an adjacent temporal motion vector predictor (TMVP) of the current block to a non-adjacent TMVP of the expanded block, adds the non-adjacent TMVP that is in the right bottom location of the expanded block in the expanded motion vector candidate list when the adjacent TMVP is in the right bottom of the current block, and adds the non-adjacent TMVP that is not in the right bottom location of the expanded block in the expanded motion vector candidate list when the adjacent TMVP is not in the right bottom of the current block.

In an embodiments, the processing circuitry obtains the value indicative of the maximum search round that is predefined or signaled in a Sequence Parameter Set (SPS), a Picture Parameter Set (PPS) or Slice header, and stops the expanding of the current block when the number of iterations exceeds the value indicative of the maximum search round.

In another embodiment, the processing circuitry obtains searching grid information that is defined by an encoder and a decoder, or signaled in a SPS, a PPS or Slice header, wherein the search grid information includes the first grid size and the second grid size.

In an embodiment, the processing circuitry calculates a new width of the expanded block and a new height of the expanded block based on the location of the current block, the first grid size, and the second grid size.

In another embodiment, the processing circuitry obtains a value indicative of a maximum search range that is defined in a macro or signaled in a SPS, a PPS or Slice header, and stops searching and locating the block for the expanded motion vector candidate list when the search round exceeds the maximum search round value, the search range exceeds a last coding tree unit (CTU) row that is above the current block, or the search range exceeds the value of maximum search range.

In some embodiments, the processing circuitry searches the plurality of blocks for the adjacent motion vector candidates and the non-adjacent motion vector candidates in the same order for the blocks on the left side of the current block and for the blocks on the above side of the current block.

In some embodiments, the processing circuitry locates a coordinate of the top left of the expanded block based on the location of the current block, the first grid size, and the second grid size, and calculates the width (newWidth) and the height (newHeight) of the expanded block based on the location of the current block, the first grid size, and the second grid size. The processing circuitry can further locate the positions of blocks for motion vector candidates based on the coordinate of the top left of the expanded block, the width (newWidth) and the height (newHeight) of the expanded block.

In some embodiments, when the search range exceeds the last CTU row that is above the current block, the processing circuitry further uses motion vector data stored in the last CTU row that is above the current block for searching and locating the block for the expanded motion vector candidate list.

In some embodiments, when the search range reaches inside a CTU that is left of a current CTU where a current block is located, the processing circuitry replaces the location of the block for the motion vector candidate by a location in a rightmost column of the left CTU, or a location in a leftmost column of the current CTU is used.

In some other embodiments, when the search range reaches inside a CTU that is above of a current CTU where a current block is located, the processing circuitry replaces the location of the block for the motion vector candidate by a location in a bottom column of the above CTU, or a location in a top column of the current CTU is used.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
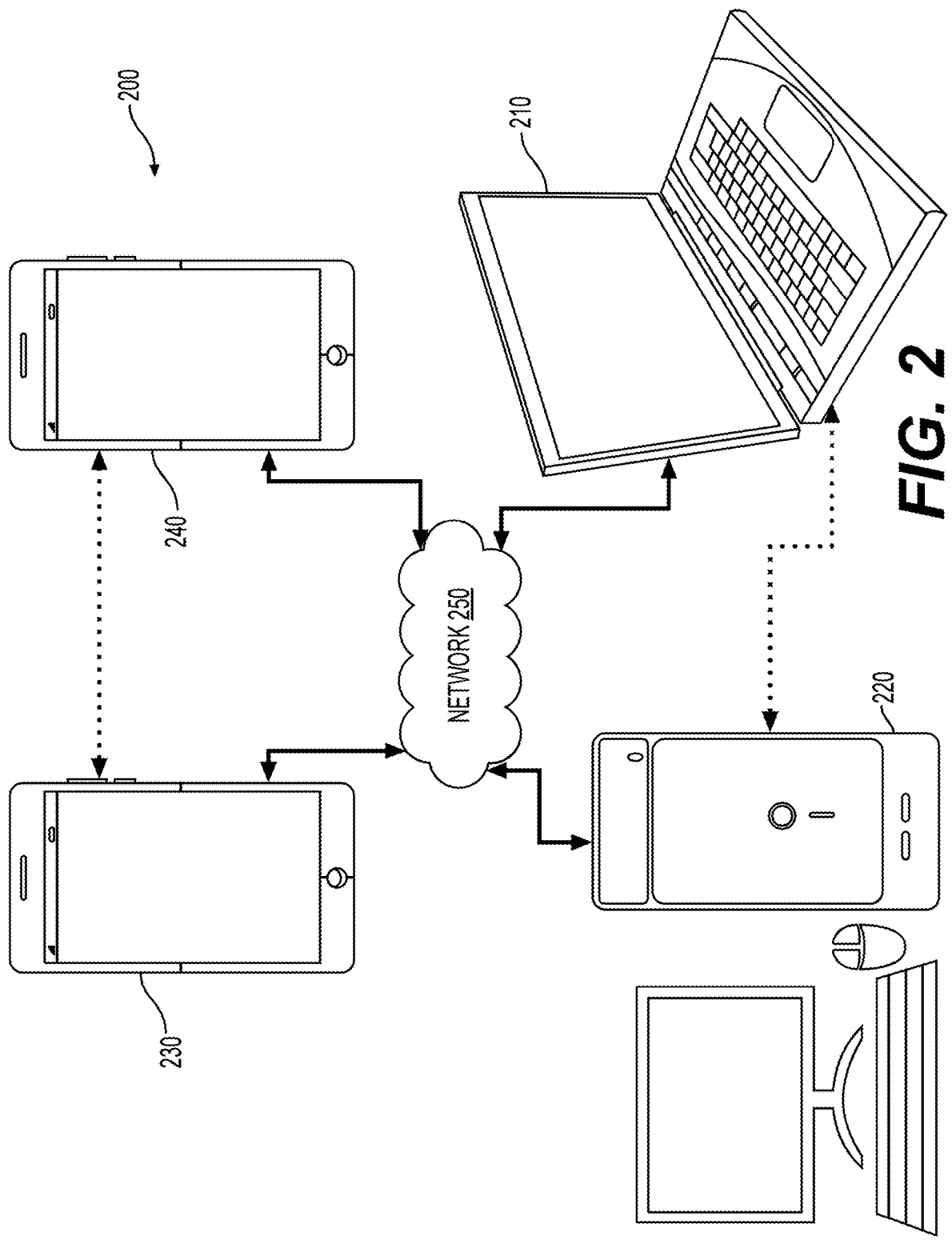
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
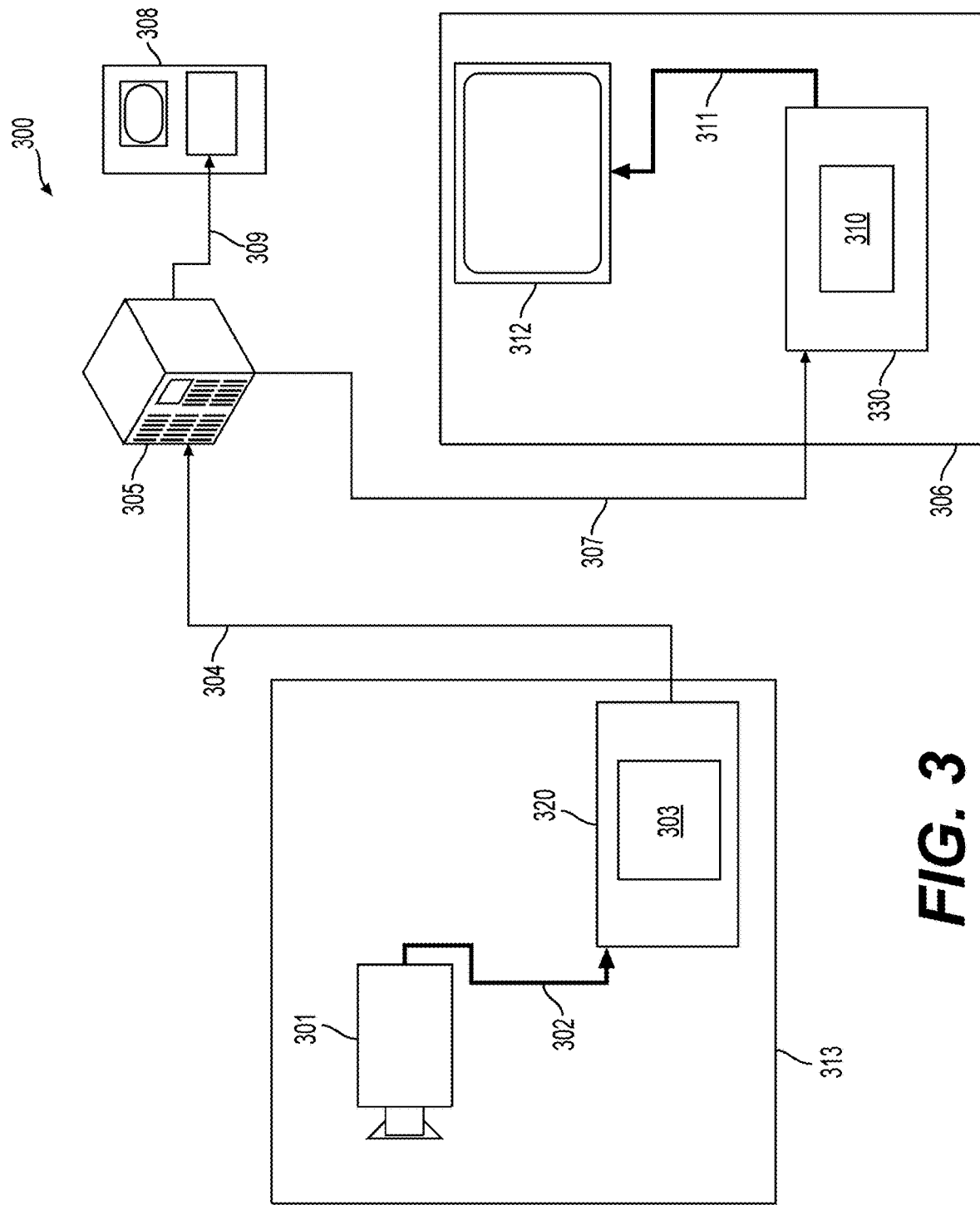
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
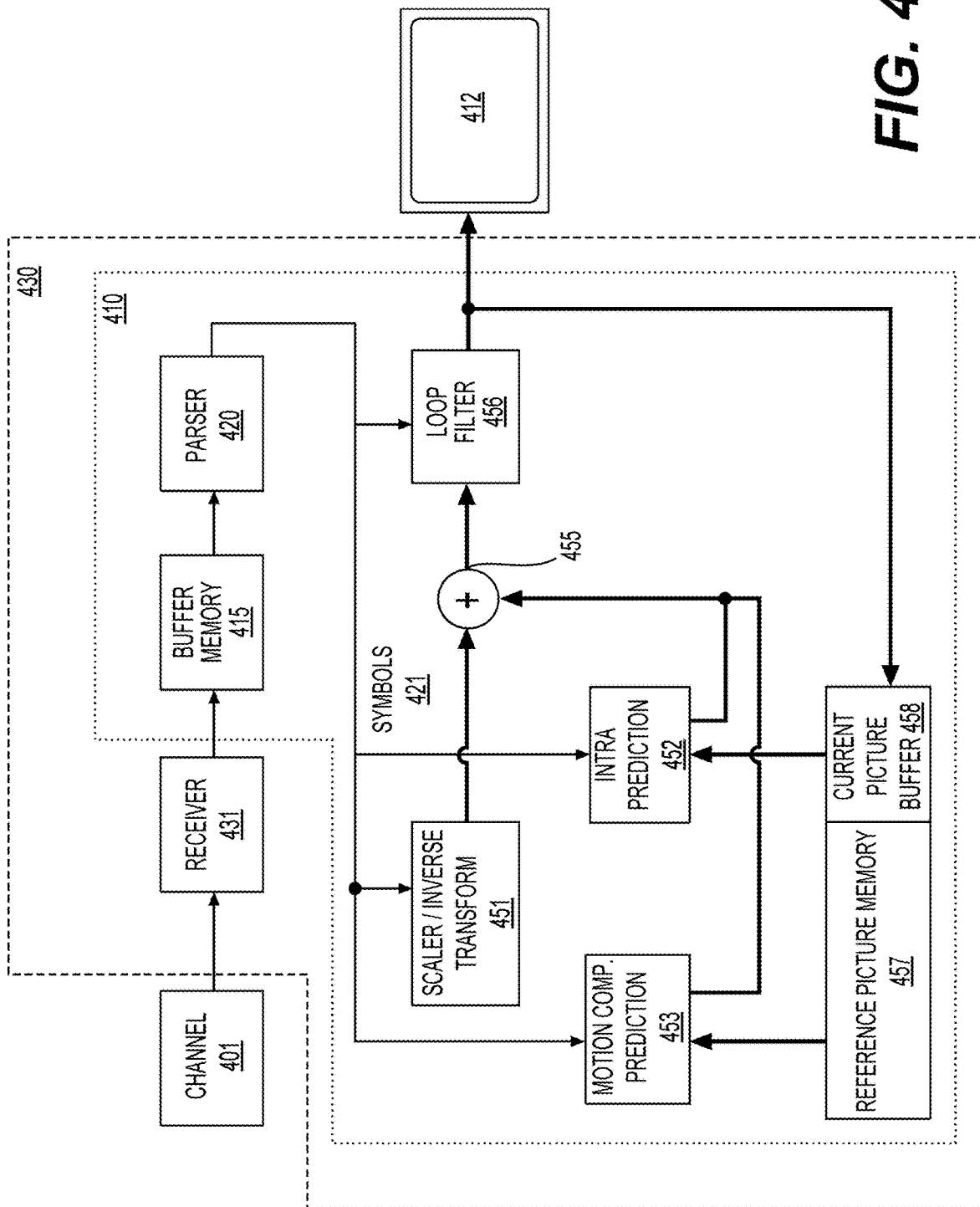
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
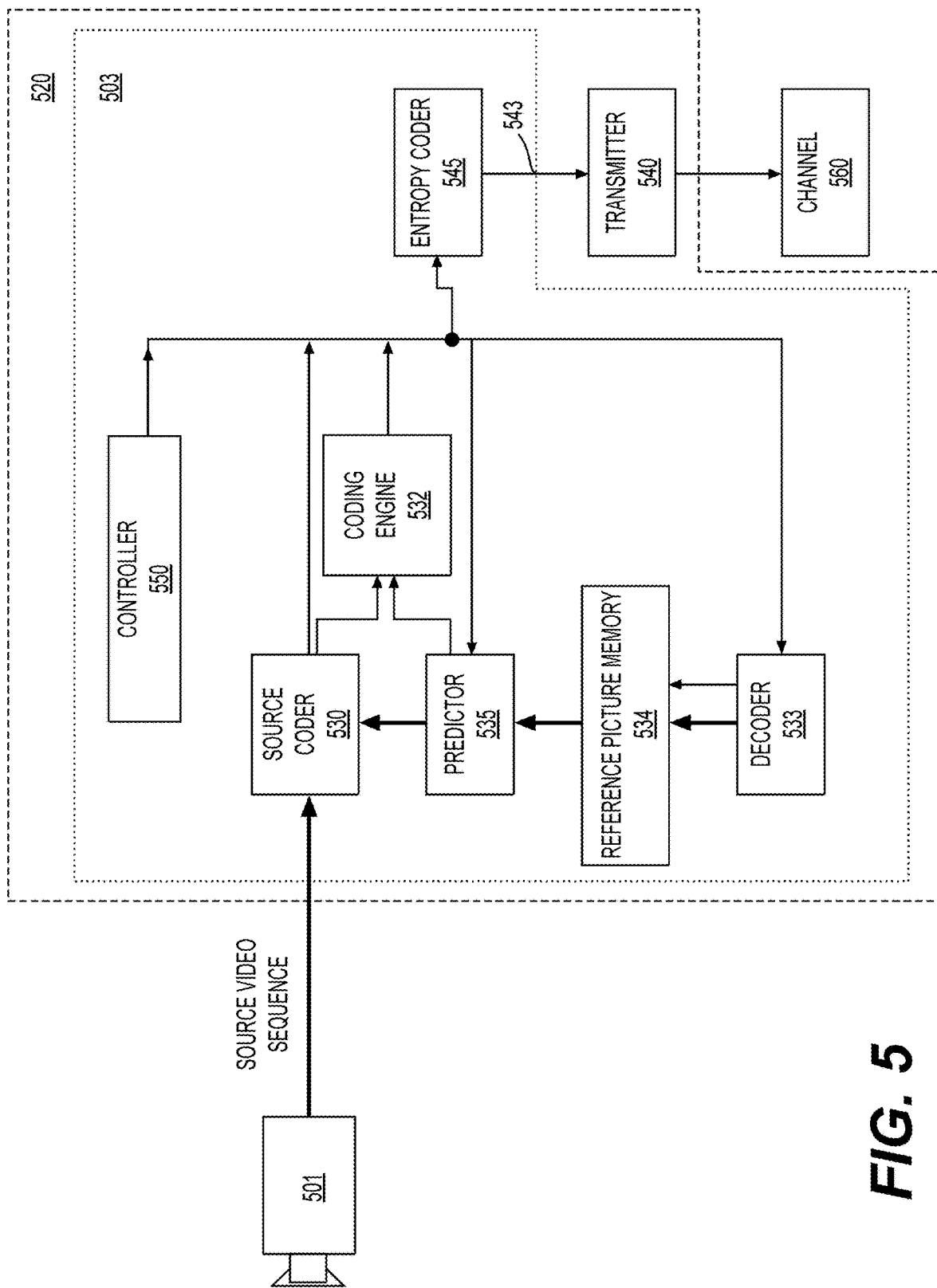
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
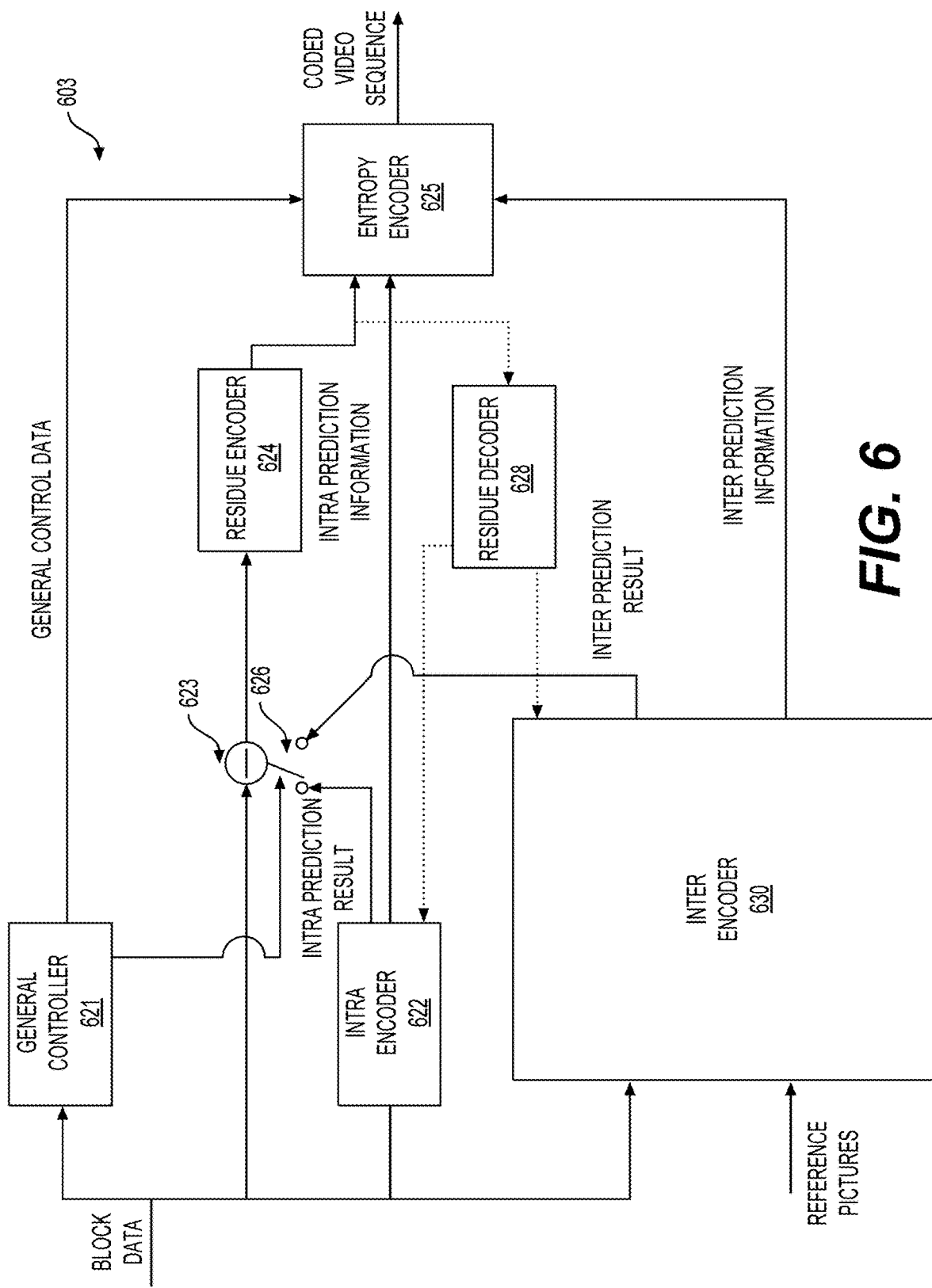
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
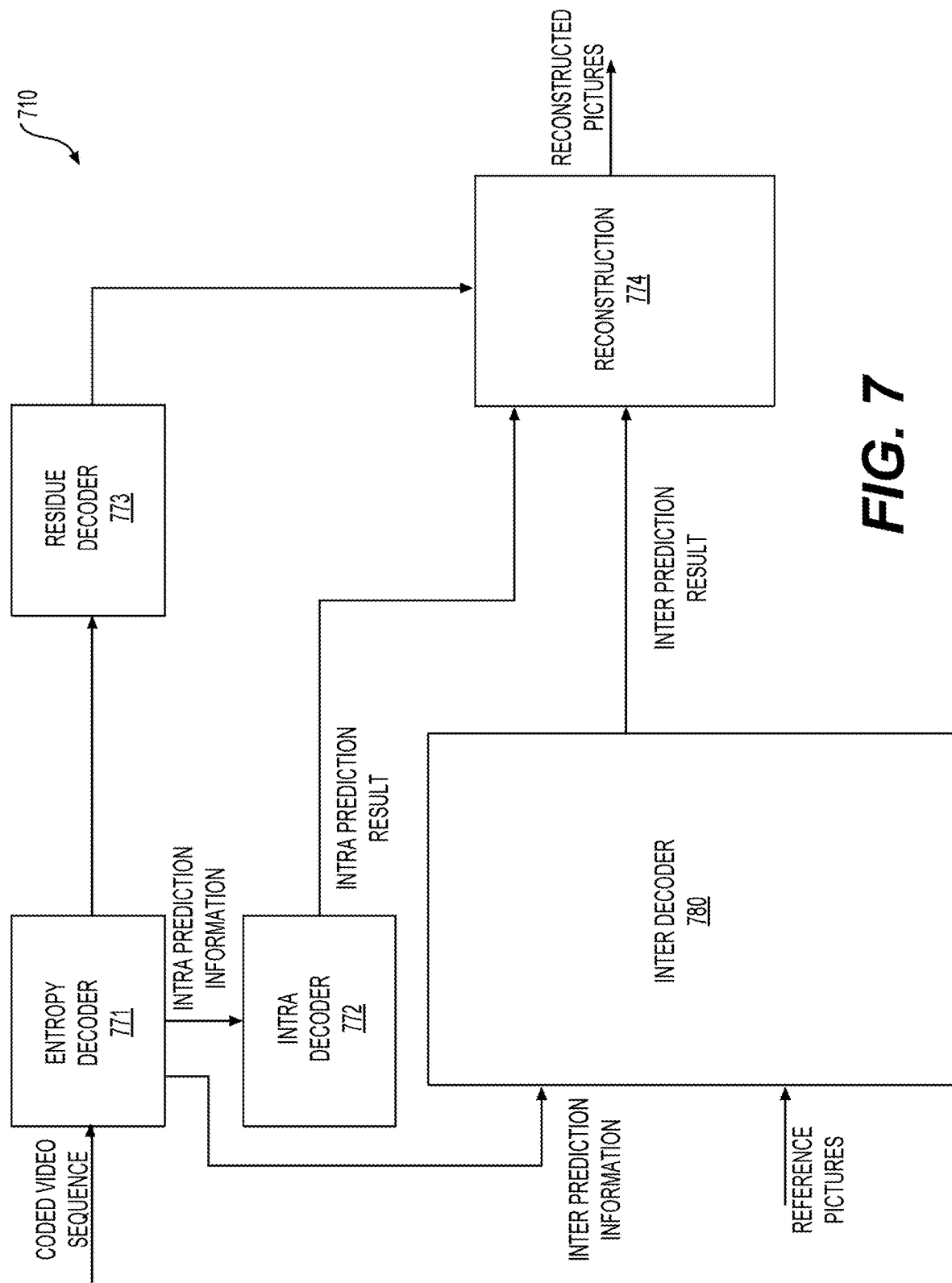
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for modifying construction of motion vector candidate list by inserting extra spatial or/and temporal motion vector candidates into a motion vector candidate list and unifying adjacent motion vector candidates and non-adjacent motion vector candidates for inter-picture prediction coding. It should be understood that the techniques presented in the disclosure can be applied to any video coding method that uses the merge concept, such as merge mode, skip mode (a special case of merge mode) and advanced motion vector prediction (AMVP) mode. Specifically, the present techniques can be also applied to construct merge candidate list and AMVP candidate list. For purposes of clarity in this description, merge mode is used for the detailed description in the present disclosure. In some embodiments, the motion vector candidate list includes merge candidates. In other embodiments, the motion vector candidate list includes AMVP candidates.

Figure 1:
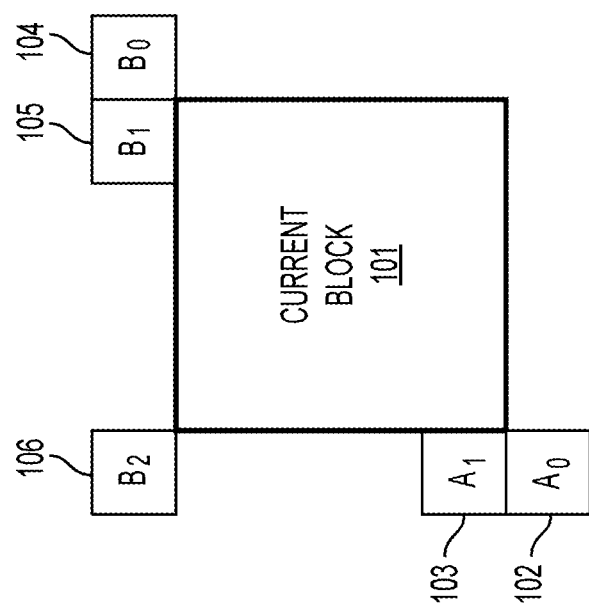
FIG. 1 is a schematic illustration of a current block and its surrounding spatial motion vector candidates in one example.

In some embodiments, a technique using block level motion vector candidates is used in motion compensation for inter-picture prediction. In this technique, a motion vector candidate list of candidate motion parameters from neighboring blocks is constructed. Then an index is signaled which identifies the candidates to be used. Merge mode also allows for temporal prediction by inserting a candidate obtained from previously coded pictures into the motion vector candidate list. For example, as shown in the FIG. 1, a motion vector candidate list can include a sequence of spatial motion vector candidates, such as blocks A0, A1, and B0, B1, B2 (102 through 106, respectively). Herein, the A0, A1, and B0, B1, B2 (102 through 106, respectively) are positioned around the current block 101 and can be further denoted as adjacent motion vector candidates.

In order to improve the inter-picture prediction coding efficiency, some new motion vector candidates can be introduced by expanding the current block. The new motion vector candidates can be searched and selected from the neighboring blocks that are positioned around the expanded block. Since these new motion vector candidates are not adjacent to the current block, they can be denoted as non-adjacent motion vector candidates.

Figure 8:
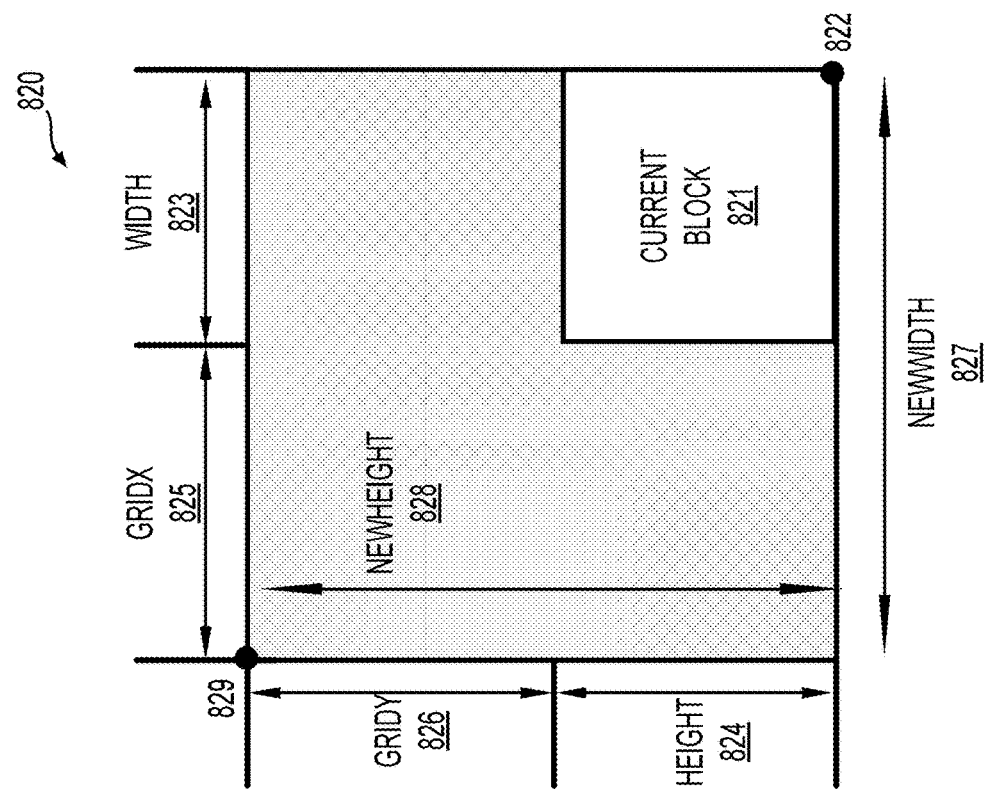
FIG. 8 shows two exemplary expanded blocks according to an embodiment of the disclosure.
Figure 8:
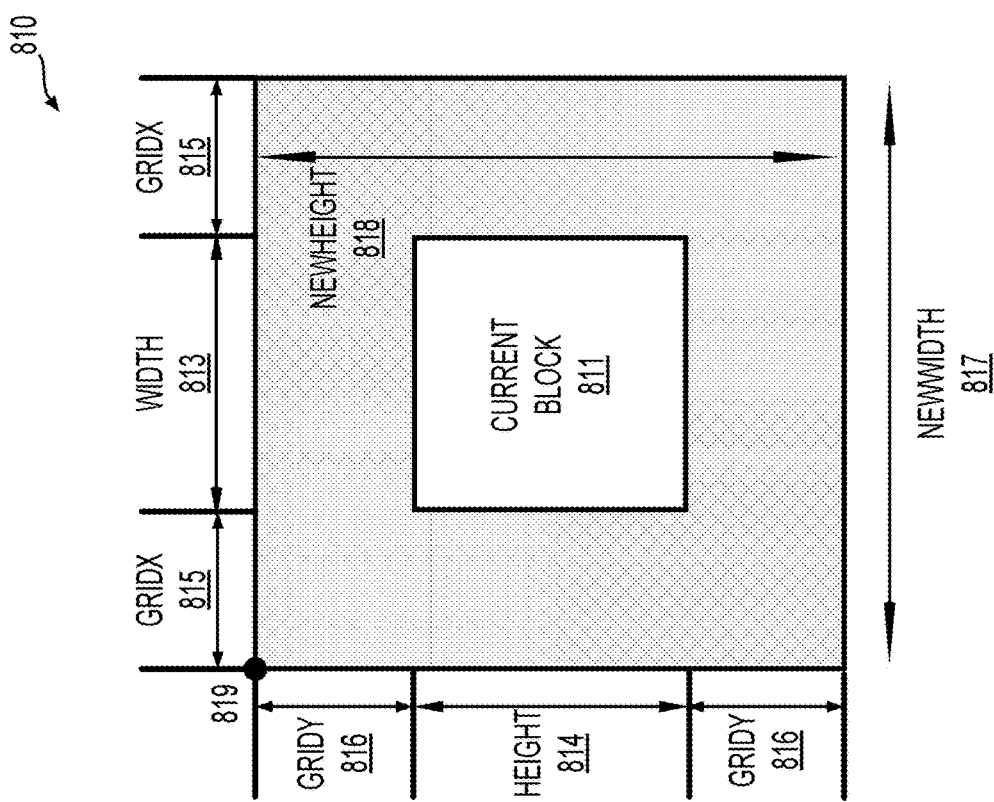

FIG. 8 shows two exemplary expanded blocks 810 and 820 according to an embodiment of the disclosure. In order to improve the inter-picture prediction performance, a block, e.g., current blocks 811 and 821, can be expanded horizontally and vertically. New motion vector candidate blocks can be searched and located in the expanded blocks 810 and 820. These motion vector candidate blocks, including adjacent motion vector candidates and non-adjacent motion vector candidates, can be added in a motion vector candidate list for motion vector prediction. There can be a total of N extension rounds for expanding the block, wherein the value of N can be predefined or signaled in a Sequence Parameter Set (SPS), a Picture Parameter Set (PPS) or Slice header. In the first extension round, for example, an expanded block can be generated from a current block by increasing the width of the current block by a first grid size (e.g., gridX) and increasing the height of the current block by a second grid size (e.g., gridY). Then starting from the second extension round, the expanded block can be further expended by increasing the width of the expanded block by the first grid size (e.g., gridX) and increasing the height of the expanded block by the second grid size (e.g., gridY). Herein, the first grid size gridX and the second grid size gridY can be the grid size of the extension, or the grid size of the search area. In some examples, the gridX and the gridY can be fixed. In some other examples, the gridX and gridY can be the current block's width and height, respectively. The values of gridX and gridY can be predefined by an encoder and a decoder, or signaled in a SPS, a PPS or Slice header. For each extension round, the top left corner of the expanded block may include an offset to the current block.

In the example illustrated in FIG. 8, when the expanded block 810 is placed around the current block 811, which is centered with respect to the expanded block, the offset 819 of the expanded block 810 to the current block 811 can be expressed as:

$$\text{Offset}X = -i*N*\text{grid}X/2, \text{Offset}Y = -i*N*\text{grid}Y/2, \quad (1)$$

for $i = 1, \ldots, N$.

Herein, OffsetX 815 and OffsetY 816 can denote the offset values of the expanded block 810 to the current block 811 in a horizontal direction and in a vertical direction, respectively. In some embodiments, the OffsetX 815 and OffsetY 816 can further denote the coordinates in a X-axis and a Y-axis of the top left corner 819 of the expanded block 810.

Accordingly, the width and the height of the expanded block 810 can be expressed as:

$$\text{newWidth}=i*2*\text{gridX}+\text{width}, \text{newHeight}=i*2*\text{gridX}+\text{height}, \quad (2)$$

for $i=1,\ldots,N^*$.

Herein, the width 813 and height 814 can denote the current block's width and height, respectively. The newWidth 817 and newHeight 818 can denote the expanded block's width and height, respectively.

In the example illustrated in FIG. 8, when the expanded block 820 is placed around the top left corner of the current block 821, the right bottom 822 of the expanded block 820 can be at the same location as the current block 821. The offset 829 of the expanded block 820 to the current block 811 can be further expressed as:

$$\text{OffsetX}=-i*N*\text{gridX}, \text{OffsetY}=-i*N*\text{gridY}, \quad (3)$$

for $i=1,\ldots,N^*$.

Herein, OffsetX 825 and OffsetY 826 can denote the offset values of the expanded block 820 to the current block 821 in horizontal direction and in vertical direction, respectively. In some embodiments, the OffsetX 825 and OffsetY 826 can further denote the coordinates in X-axis and Y-axis of the top left corner 829 of the expanded block 820.

Accordingly, the width and the height of the expanded block 820 can be expressed as:

$$\text{newWidth}=i*\text{gridX}+\text{width}, \text{newHeight}=i*\text{gridX}+\text{height}, \quad (4)$$

for $i=0,1,\ldots,N$.

Herein, the width 823 and height 824 can denote the current block's width and height, respectively. The newWidth 827 and newHeight 828 can denote the expanded block's width and height, respectively.

Based on equations (2) and (4), the expanded block's width and height can be expressed in a more general expression, which is given by:

$$\text{newWidth}=i*N*\text{gridX}+\text{width}, \text{newHeight}=i*N*\text{gridX}+\text{height}, \quad (5)$$

for $i=0,1,\ldots,N$; $N$ can be $1,2,3,\ldots$

Figure 9:
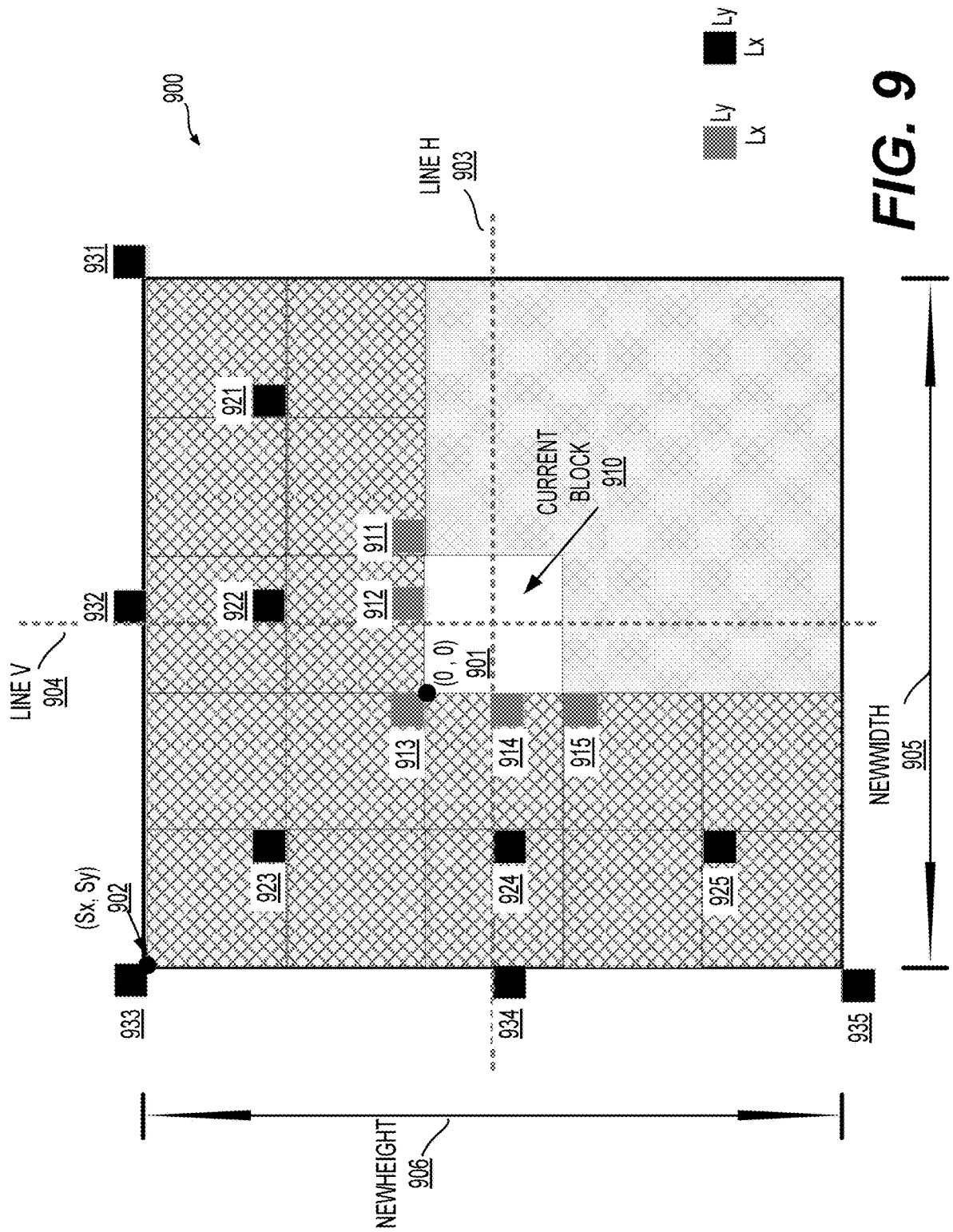
FIG. 9 shows an exemplary motion vector candidate layout in an expanded block according to an embodiment of the disclosure.

FIG. 9 shows an exemplary motion vector candidate layout in an expanded block 900 according to an embodiment of the disclosure. The expanded block 900 is positioned around the current block 910 such that the current block 910 is in the center of the expanded block 900. The first and the second grid size can be selected as the current block's width and height, such as gridX=width and gridY=height, as shown in FIG. 8. The top left corner 902 position of the expanded block can be treated as $(S_x, S_y)$ and the top left corner 901 position of the current block 910 can be treated as (0, 0).

In one embodiment, the adjacent motion vector candidate 911~915 can have middle candidates 912 and 914 that are shown in the FIG. 9. After expanding the current block 910, new motion vector candidates can be searched and located in the expanded block 900. Then the new motion vector candidates can be added into the motion vector candidate list. In the present disclosure, the number of extension rounds is equal to the number of search rounds because when the search of new motion vector candidates is stopped, the block extension can also be stopped. Alternatively, when the block stops expanding, the search of new motion vector candidates is also stopped accordingly. Therefore, every iteration can include a search round and an extension round, and the maximum number of iterations, which is equivalent to the number of extension rounds and the number of search rounds, can be denoted as N.

In particular, the search of the new motion vector candidates can be performed after each extension round until the search round achieves a value indicative of a maximum search round (e.g., MaxSearchRounds=N), wherein the value of N can be predefined or signaled in a SPS, a PPS or Slice header. In each search round, the search order of the new motion vector candidates can be the same as the search order of the adjacent motion vector candidates. When the number of search rounds is equal to N, the search of the new motion vector candidates is stopped, and the expanded block is also stopped expanding accordingly. In the FIG. 9 example, the maximum search round value N is set to 2. Therefore, two extension rounds are conducted accordingly.

Specifically, the search order of the adjacent motion vector candidates 911~915 can be {915, 914, Scaled 915, Scaled 914} for the motion vector candidates on the left of the current block 910 and {911, 912, 913, Scaled 911, Scaled 912, Scaled 913} for the motion vector candidates on the above side of the current block 910. Herein, Scaled 911~Scaled 915 are motion vector candidates that are scaled according to a scale factor. The scaled factor can be determined by the temporal distance between the candidate reference picture and the current reference picture and the temporal distance between the current picture and the reference picture of the current block.

In the first extension round, the current block 910 can expand its width by 2*gridX (e.g., 2*width) and its height by 2*gridY (e.g., 2*height). Then, new motion vector candidates 921~925 can be searched and located from neighboring blocks which are positioned around the expanded block 900 but not adjacent to the current block 901. Herein, the new motion vector candidates 921~925 can be searched in the same order as the adjacent motion vector candidates 911~915, which can be {925, 924, Scaled 925, Scaled 924} for the motion vector candidates on the left of the expanded block 900 and {921, 922, 923, Scaled 921, Scaled 922, Scaled 923} for the motion vector candidates on the above side of the expanded block 900. Herein, Scaled 921~Scaled 925 are motion vector candidates are scaled according to a scale factor. The scaled factor can be determined by the temporal distance between the candidate reference picture and the current reference picture and the temporal distance between the current picture and the reference picture of the current block. These new motion vector candidates 921~925 can be further added into the motion vector candidate list as the non-adjacent motion vector candidates.

In the second extension round, the expanded block 900 can further expand its width horizontally by 2*gridX (e.g., 2*width) and its height vertically by 2*gridY (e.g., 2*height). Then, new motion vector candidates 931~935 can be searched and located from neighboring blocks which are positioned around the expanded block 900, but not adjacent to the current block 901. Similarly, the search order of the new motion vector candidates 931~935 can be {935, 934, Scaled 935, Scaled 934} for the motion vector candidates on the left of the expanded block 900 and {931, 932, 933, Scaled 931, Scaled 932, Scaled 933} for the motion vector candidates on the above side of the expanded block 900. Herein, Scaled 931~Scaled 935 are motion vector candidates that are scaled according to a scale factor. The scaled factor can be determined by the temporal distance between the candidate reference picture and the current reference picture and the temporal distance between the current picture and the reference picture of the current block. These new motion vector candidates 931~935 can be further added into the motion vector candidate list as the non-adjacent motion vector candidates. Then the expanded block 900 can be further expanded and new motion vector candidates can be further searched until certain constraints are met. For example, the number of extensions may be constrained by the maximum number N of permitted extensions.

In an embodiment, the search of the adjacent motion vector candidates and the non-adjacent motion vector candidates on the left side of the current block 910 and the expanded block 900 can be performed first, then the search of the adjacent motion vector candidates and the non-adjacent motion vector candidates on the above side of the current block 910 and the expanded block 900 can be performed afterwards. For example, {915, 914, Scaled 915, Scaled 914}, {925, 924, Scaled 925, Scaled 924}, and {935, 934, Scaled 935, Scaled 934} can be searched first. Then {911, 912, 913, Scaled 911, Scaled 912, Scaled 913}, {921, 922, 923, Scaled 921, Scaled 922, Scaled 923}, and {931, 932, 933, Scaled 931, Scaled 932, Scaled 933} can be searched afterwards.

In an alternative embodiment, the search of the adjacent motion vector candidates and the non-adjacent motion vector candidates on the above side of the current block 910 and the expanded block 900 can be performed first, then the search of the adjacent motion vector candidates and the non-adjacent motion vector candidates on the left side of the current block 910 and the expanded block 900 can be performed afterwards. For example, {911, 912, 913, Scaled 911, Scaled 912, Scaled 913}, {921, 922, 923, Scaled 921, Scaled 922, Scaled 923}, and {931, 932, 933, Scaled 931, Scaled 932, Scaled 933} can be searched first. Then {915, 914, Scaled 915, Scaled 914}, {925, 924, Scaled 925, Scaled 924}, and {935, 934, Scaled 935, Scaled 934} can be searched afterwards.

In another embodiment, the search of the adjacent motion vector candidates including the motion vector candidates on the left side of the current block 910 and the motion vector candidates on the above side of the current block 910 can be performed first, then the search of the non-adjacent motion vector candidates on the left side of the expanded block 900 and the non-adjacent motion vector candidates on the above side of the expanded block 900 can be performed afterwards. {915, 914, Scaled 915, Scaled 914} and {911, 912, 913, Scaled 911, Scaled 912, Scaled 913} can be searched first. Then {925, 924, Scaled 925, Scaled 924} and {921, 922, 923, Scaled 921, Scaled 922, Scaled 923} can be searched afterwards. Finally, {935, 934, Scaled 935, Scaled 934} and {931, 932, 933, Scaled 931, Scaled 932, Scaled 933} can be searched.

After each extension round, the positions of the new motion vector candidates can be located according to the position of the top left corner 902 of the expanded block 900, the width 905 and the height 906 of the expanded block 900. For example, after the second extension round, the top left corner 902 position of the expanded block can be treated as $(S_x, S_y)$. The width and the height of the expanded block 900 can be denoted as newWidth 905 and newHeight 906, respectively. Herein, the newWidth 905 and the newHeight 906 can be obtained based on equation (2). After each extension round, the newWidth 905 and the newHeight 906 can be updated appropriately, such as 2*gridX increment in the newWidth 905 and 2*gridY increment in the newHeight 906 in the FIG. 9 example.

In an example, the width size and height size of a motion vector candidate (solid grey and solid black small blocks shown in the FIG. 9) can be denoted as $L_x$ and $L_y$, respectively. In some examples, the motion vector candidate can be a sample block with various block sizes, such as 4×4, 8×8, 4×8, or 16×16 samples each. Therefore, the values of $L_x$ and $L_y$ can be 4×4, 8×8, 4×8, or 16×16, respectively. The position of the top left block 933 of the expanded block 900 can be calculated as $(S_x-L_x, S_y-L_y)$. For example, when the $L_x$=4 and the $L_y$=4, the position of the top left block 933 of the expanded block 900 is $(S_x-4, S_y-4)$.

The position of the above middle block 932 of the expanded block 900 can be calculated as $(S_x+(newWidth>>1), S_y-L_y)$, wherein the >> is a bitwise right shifting operation, which is equivalent to dividing the newWidth by 2. For example, when the newWidth=32, the $L_x$=4 and the $L_y$=4, the position of the above middle block 932 of the expanded block 900 is $(S_x+16, S_y-4)$.

The position of the left middle block 934 of the expanded block 900 can be calculated as $(S_x-L_x, S_y+(newHeight>>1))$, wherein the >> is the bitwise right shifting operation, which is equivalent to dividing the newHeight by 2. For example, when the newHeight=32, the $L_x$=4 and the $L_y$=4, the position of the left middle block 934 of the expanded block 900 is $(S_x-4, S_y+16)$.

The position of the top right block 931 of the expanded block 900 can be obtained by vertically mirroring the top left block 933 of the expanded block 900 along a vertical line 904 across the middle of the expanded block 900.

The position of the bottom left block 935 of the expanded block 900 can be obtained by horizontally mirroring the top left block 933 of the expanded block 900 along a horizontal line 903 across the middle of the expanded block 900.

The positions of the motion vector candidates 911~915 after the first extension round can be obtained in a similar way.

In some embodiments, the search of the new motion vector candidates can be constrained by a last coding tree unit (CTU) row and a maximum search range value (e.g., MaxSearchRange). The maximum search range value can be defined in the macro or signaled at a SPS, a PPS or Slice header. Herein, the macro can be a predefined variable in the memory of the decoder. In some examples, the search of the new motion vector candidates is stopped when the search range exceeds a last CTU row that is above the current block. In some other examples, the search of the new motion vector candidates is stopped when the search range exceeds the value of maximum search range.

In some embodiments, the search range is not allowed to reach inside a CTU that is left of a current CTU where the current block is located. When a motion vector candidate's position is inside the left CTU, the position of the motion vector candidate is replaced by either the related position in the rightmost column of the left CTU, or the related position in the leftmost column of the current CTU.

Figure 10:
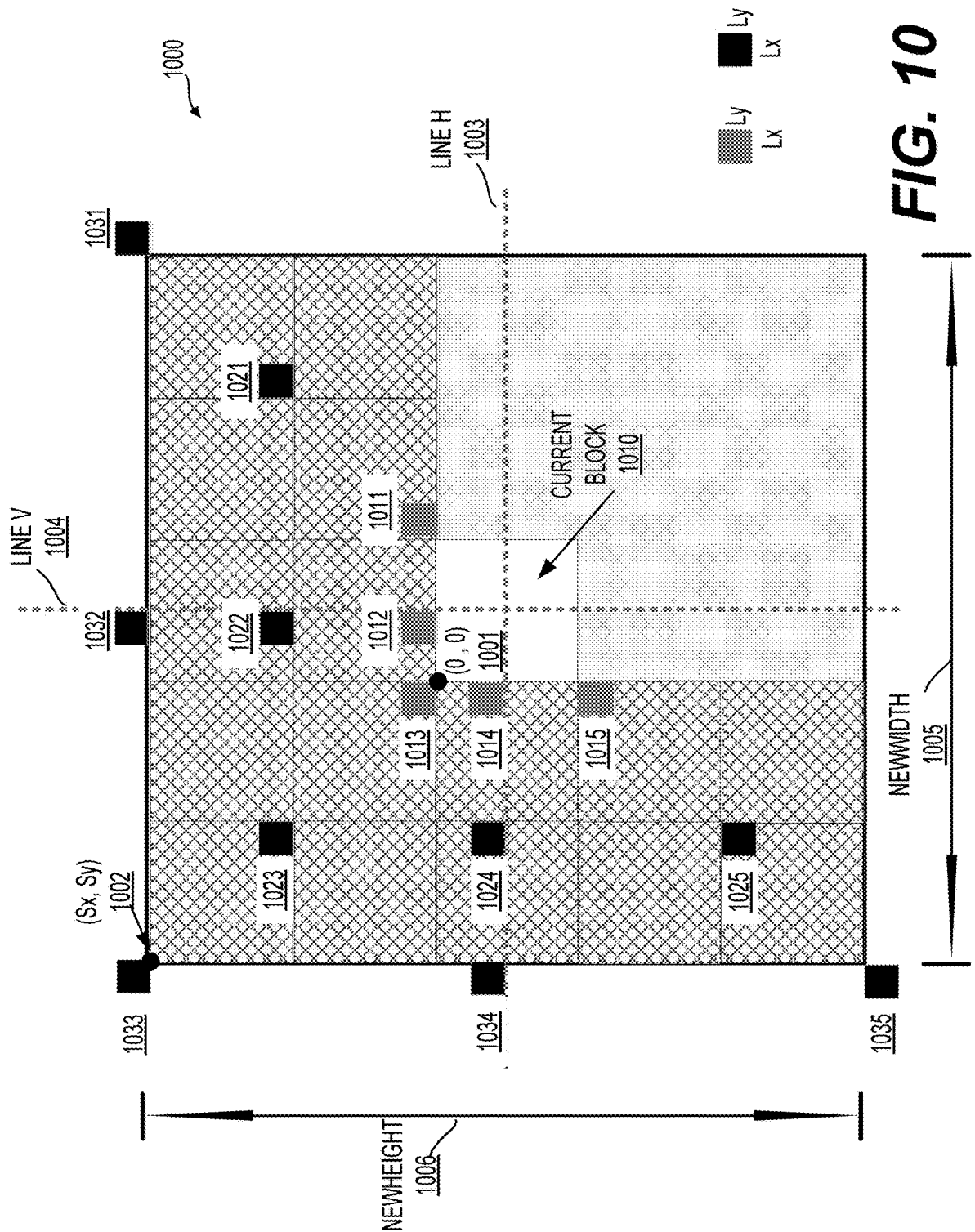
FIG. 10 shows another exemplary motion vector candidate layout in an expanded block according to an embodiment of the disclosure.

FIG. 10 shows another exemplary motion vector candidate layout in an expanded block 1000 according to an embodiment of the disclosure. The expanded block 1000 is positioned around the current block 1010 such that the current block 1010 is in the center of the expanded block. The first and the second grid size can be selected as the current block's width and height, such as gridX=width and gridY=height, as shown in FIG. 8. The top left corner 1002 position of the expanded block can be treated as $(S_x, S_y)$ and the top left corner 1001 position of the current block 1010 can be treated as (0, 0).

In one embodiment, the adjacent motion vector candidate 1011~1015 can have middle candidates 1012 and 1014 that are shown in FIG. 10. After expanding the current block 1010, new motion vector candidates can be searched and located in the expanded block 1000. Then the new motion vector candidates can be added into the motion vector candidate list. In the present disclosure, the number of extension rounds is equal to the number of search rounds because when the search of new motion vector candidates is stopped, the block extension can also be stopped. Alternatively, when the block stops expanding, the search of new motion vector candidates is also stopped accordingly. Therefore, every iteration can include a search round and an extension round, and the maximum number of iterations, which is equivalent to the number of extension rounds and the number of search rounds, can be denoted as N.

In particular, the search of the new motion vector candidates can be performed after each extension round until the search round achieves a value indicative of a maximum search round (e.g., MaxSearchRounds=N), wherein the value of N can be predefined or signaled in a SPS, a PPS or Slice header. In each search round, the search order of the new motion vector candidates can be the same as the search order of the adjacent motion vector candidates. When the number of search rounds equals to N, the search of the new motion vector candidates is stopped, and the expanded block is also stopped expanding accordingly. In the FIG. 10 example, the maximum search round value N is set to 2. Therefore, two extension rounds are conducted accordingly.

Specifically, the search order of the adjacent motion vector candidates 1011~1015 can be {1015, 1014, Scaled 1015, Scaled 1014} for the motion vector candidates on the left of the current block 1010 and {1011, 1012, 1013, Scaled 1011, Scaled 1012, Scaled 1013} for the motion vector candidates on the above side of the current block 1010. Herein, Scaled 1011~Scaled 1015 are motion vector candidates that are constructed from motion vectors (MVs) that are scaled according to a scale factor. The scaled factor can be determined by the temporal distance between the candidate reference picture and the current reference picture and the temporal distance between the current picture and the reference picture of the current block.

In the first extension round, the current block 1010 can expand its width by 2*gridX (e.g., 2*width) and its height by 2*gridY (e.g., 2*height). Then, new motion vector candidates 1021~1025 can be searched and located from neighboring blocks which are positioned around the expanded block 1000 but not adjacent to the current block 1001. Herein, the new motion vector candidates 1021~1025 can be searched in the same order as the adjacent motion vector candidates 1011~1015, which can be {1025,1024, Scaled 1025, Scaled 1024} for the motion vector candidates on the left of the expanded block 1000 and {1021, 1022, 1023, Scaled 1021, Scaled 1022, Scaled 1023} for the motion vector candidates on the above side of the expanded block 1000. Herein, Scaled 1021~Scaled 1025 are motion vector candidates that are scaled according to a scale factor. The scaled factor can be determined by the temporal distance between the candidate reference picture and the current reference picture and the temporal distance between the current picture and the reference picture of the current block. These new motion vector candidates 1021~1025 can be further added into the motion vector candidate list as the non-adjacent motion vector candidates.

In the second extension round, the expanded block 1000 can further expand its width horizontally by 2*gridX (e.g., 2*width) and its height vertically by 2*gridY (e.g., 2*height). Then, new motion vector candidates 1031~1035 can be searched and located from neighboring blocks which are positioned around the expanded block 1000 but not adjacent to the current block 1001. Similarly, the search order of the new motion vector candidates 1031~1035 can be {1035, 1034, Scaled 1035, Scaled 1034} for the motion vector candidates on the left of the expanded block 1000 and {1031, 1032, 1033, Scaled 1031, Scaled 1032, Scaled 1033} for the motion vector candidates on the above side of the expanded block 1000. Herein, Scaled 1031~Scaled 1035 are motion vector candidates that are scaled according to a scale factor. The scaled factor can be determined by the temporal distance between the candidate reference picture and the current reference picture and the temporal distance between the current picture and the reference picture of the current block. These new motion vector candidates 1031~1035 can be further added into the motion vector candidate list as the non-adjacent motion vector candidates. Then the expanded block 1000 can be further expanded, and new motion vector candidates can be further searched until certain constraints are met. For example, the number of extensions may be constrained by the maximum number N of permitted extensions.

In an embodiment, the search of the adjacent motion vector candidates and the non-adjacent motion vector candidates on the left side of the current block 1010 and the expanded block 1000 can be performed first, then the search of the adjacent motion vector candidates and the non-adjacent motion vector candidates on the above side of the current block 1010 and the expanded block 1000 can be performed afterwards. For example, {1015, 1014, Scaled 1015, Scaled 1014}, {1025, 1024, Scaled 1025, Scaled 1024}, and {1035, 1034, Scaled 1035, Scaled 1034} can be searched first. Then {1011, 1012, 1013, Scaled 1011, Scaled 1012, Scaled 1013}, {1021, 1022, 1023, Scaled 1021, Scaled 1022, Scaled 1023}, and {1031, 1032, 1033, Scaled 1031, Scaled 1032, Scaled 1033} can be searched afterwards.

In an alternative embodiment, the search of the adjacent motion vector candidates and the non-adjacent motion vector candidates on the above side of the current block 1010 and the expanded block 1000 can be performed first, then the search of the adjacent motion vector candidates and the non-adjacent motion vector candidates on the left side of the current block 1010 and the expanded block 1000 can be performed afterwards. For example, {1011, 1012, 1013, Scaled 1011, Scaled 1012, Scaled 1013}, {1021, 1022, 1023, Scaled 1021, Scaled 1022, Scaled 1023}, and {1031, 1032, 1033, Scaled 1031, Scaled 1032, Scaled 1033} can be searched first. Then {1015, 1014, Scaled 1015, Scaled 1014}, {1025, 1024, Scaled 1025, Scaled 1024}, and {1035, 1034, Scaled 1035, Scaled 1034} can be searched afterwards.

In another embodiment, the search of the adjacent motion vector candidates including the motion vector candidates on the left side of the current block 1010 and the motion vector candidates on the above side of the current block 1010 can be performed first, then the search of the non-adjacent motion vector candidates on the left side of the expanded block 1000 and the non-adjacent motion vector candidates on the above side of the expanded block 1000 can be performed afterwards. {1015, 1014, Scaled 1015, Scaled 1014} and {1011, 1012, 1013, Scaled 1011, Scaled 1012, Scaled 1013} can be searched first. Then {1025, 1024, Scaled 1025, Scaled 1024} and {1021, 1022, 1023, Scaled 1021, Scaled 1022, Scaled 1023} can be searched afterwards. Finally, {1035, 1034, Scaled 1035, Scaled 1034} and {1031, 1032, 1033, Scaled 1031, Scaled 1032, Scaled 1033} can be searched.

After each extension round, the positions of the new motion vector candidates can be located, for example, according to (i) the position of the top left corner 1002 of the expanded block 1000, and (ii) the width 1005 and the height 1006 of the expanded block 1000. For example, after the second extension round, the top left corner 1002 position of the expanded block can be treated as ($S_x$, $S_y$). The width and the height of the expanded block 1000 can be denoted as newWidth 1005 and newHeight 1006, respectively. Herein, the newWidth 1005 and the newHeight 1006 can be obtained based on equation (2). After each extension round, the newWidth 1005 and the newHeight 1006 can be updated appropriately, such as 2*gridX increment in the newWidth 1005 and 2*gridY increment in the newHeight 1006 in the FIG. 10 example.

In an example, the width size and height size of a motion vector candidate (solid grey and solid black small blocks shown in FIG. 10) can be denoted as $L_x$ and $L_y$, respectively. In some examples, the motion vector candidate can be a sample block with various block sizes, such as 4×4, 8×8, 4×8, or 16×16 samples each. Therefore, the values of $L_x$ and $L_y$ can be 4×4, 8×8, 4×8, or 16×16, respectively. The position of the top left block 1033 of the expanded block 1000 can be calculated as ($S_x-L_x$, $S_y-L_y$). For example, when the $L_x=4$ and the $L_y=4$, the position of the top left block 1033 of the expanded block 1000 is ($S_x-4$, $S_y-4$).

The position of the above middle block 1032 of the expanded block 1000 can be calculated as ($S_x$+(new-Width>>1)−$L_x$, $S_y-L_y$), wherein the >> is a bitwise right shifting operation, which is equivalent to dividing the newWidth by 2. For example, when the newWidth=32, the $L_x=4$ and the $L_y=4$, the position of the above middle block 1032 of the expanded block 1000 is ($S_x+12$, $S_y-4$).

The position of the left middle block 1034 of the expanded block 1000 can be calculated as ($S_x-L_x$, $S_y$+(newHeight>>1)−$L_y$), wherein the >> is the bitwise right shifting operation, which is equivalent to dividing the newHeight by 2. For example, when the newHeight=32, the $L_x=4$ and the $L_y=4$, the position of the left middle block 1034 of the expanded block 1000 is ($S_x-4$, $S_y+12$).

The position of the top right block 1031 of the expanded block 1000 can be obtained by vertically mirroring the top left block 1033 of the expanded block 1000 along a vertical line 1004 across the middle of the expanded block 1000.

The position of the bottom left block 1035 of the expanded block 1000 can be obtained by horizontally mirroring the top left block 1033 of the expanded block 1000 along a horizontal line 1003 across the middle of the expanded block 1000.

The positions of the motion vector candidates 1011~1015 after the first extension round can be obtained in the similar way.

In some embodiments, the search of the new motion vector candidates can be constrained by a last coding tree unit (CTU) row and a maximum search range value (e.g., MaxSearchRange). The value of the maximum search range can be defined in the macro or signaled in a SPS, a PPS or Slice header. Herein, the macro can be a predefined variable in the memory of the decoder. In some examples, the search of the new motion vector candidates is stopped when the search range exceeds a last CTU row that is above the current block. In some other examples, the search of the new motion vector candidates is stopped when the search range exceeds the value of maximum search range.

In some embodiments, the search range is not allowed to reach inside a CTU that is left of a current CTU where the current block is located. When a motion vector candidate's position is inside the left CTU, the position of the motion vector candidate is replaced by either the related position in the rightmost column of the left CTU, or the related position in the leftmost column of the current CTU.

Figure 11:
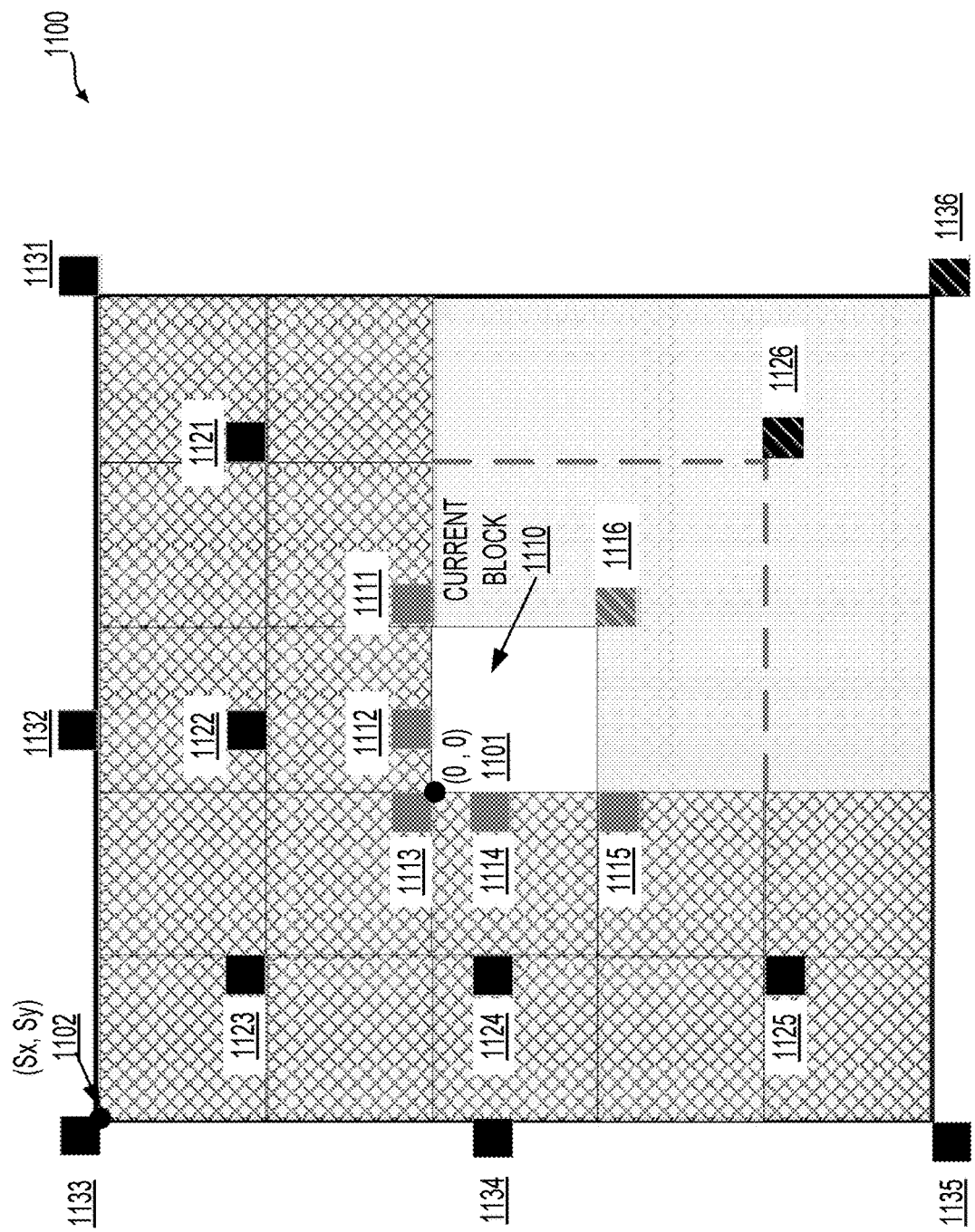
FIG. 11 shows an exemplary temporal motion vector candidate layout in an expanded block according to an embodiment of the disclosure.

FIG. 11 shows an exemplary temporal motion vector candidate layout in an expanded block 1100 according to an embodiment of the disclosure. The expanded block 1100 is positioned around the current block 1110. The top left corner 1102 position of the expanded block can be treated as ($S_x$, $S_y$) and the top left corner 1101 position of the current block 1110 can be treated as (0, 0).

As shown in the FIG. 11, blocks 1111~1115, 1121~1125, and 1131~1135 are all spatial motion vector candidates. When unifying the adjacent motion vector candidates 1111~1115 and the non-adjacent motion vector candidates 1121~1125 and 1131~1135, temporal motion vector candidates can also be considered in the motion vector candidate list. For example, blocks 1116, 1126, and 1136 can be treated as the temporal motion vector candidates in the FIG. 11 example. In particular, block 1116 is an adjacent temporal motion vector predictor (TMVP), 1126 is a non-adjacent temporal motion vector predictor (TMVP) after the first extension round, and 1136 is a non-adjacent temporal motion vector predictor (TMVP) after the second extension round.

In one embodiment, the adjacent temporal motion vector predictor (TMVP) 1116 that is in the right bottom location of the current block 1110 can be added into the motion vector candidate list. Further, after each block extension round, a new TMVP (e.g., 1126 or/and 1136) that is in the right bottom location of the expanded block 1100 can also be added into the motion vector candidate list.

In another embodiment, when the TMVP 1116 is in other location of the current block 1110 which is not in the right bottom location of the current block 1110, the TMVP 1116 can also be added into the motion vector candidate list. After each block extension round, a new TMVP (e.g., 1126 or/and 1136) that is in the corresponding location of the expanded block 1100, which is not in the right bottom location of the expanded block 1100, can also be added into the motion vector candidate list.

Figure 12:
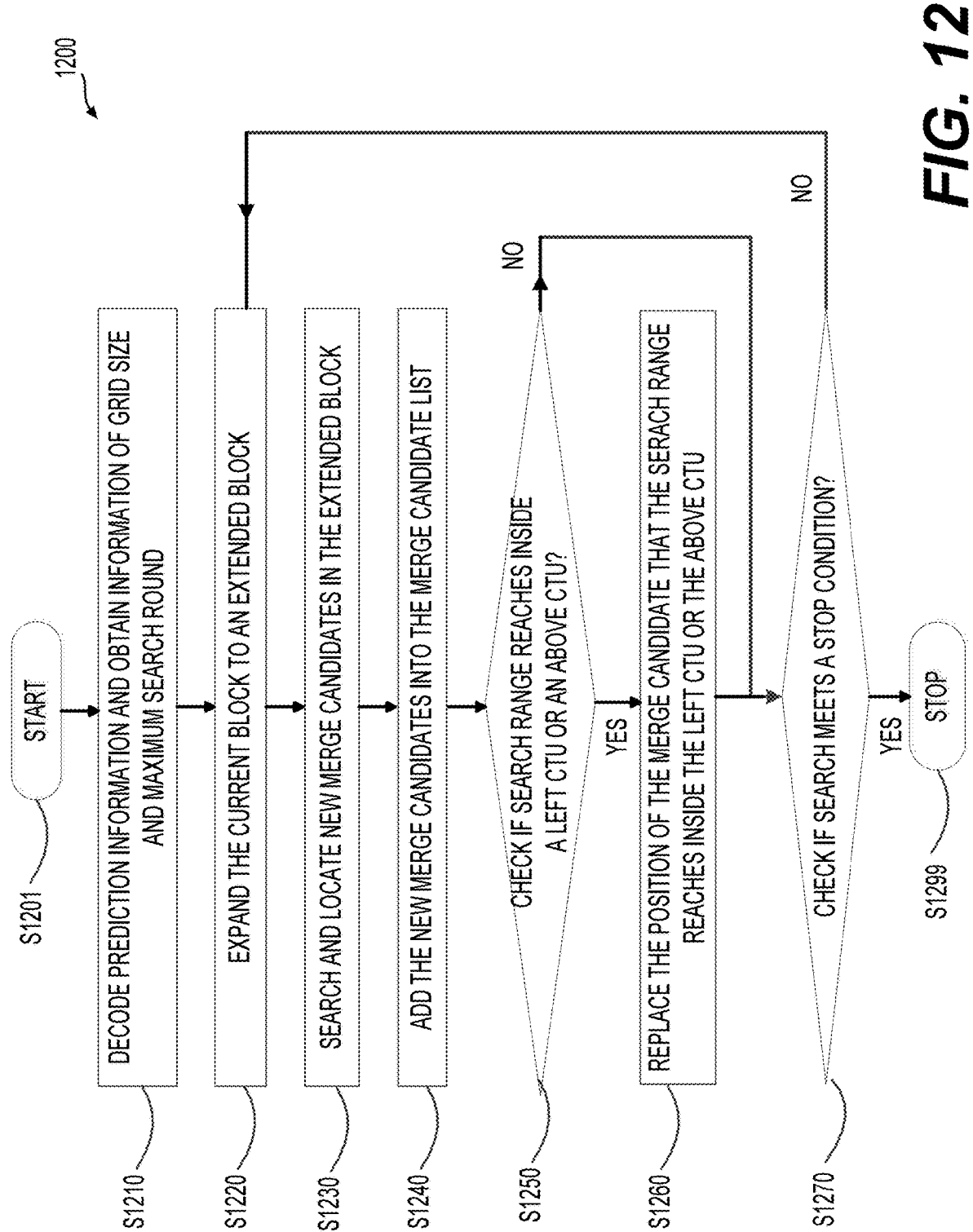
FIG. 12 shows a flow chart outlining a process example according to some embodiments of the disclosure.

FIG. 12 shows a flow chart outlining a process (1200) according to an embodiment of the disclosure. The process (1200) can be used in the reconstruction of a block coded in inter prediction mode, so to generate a prediction block for the block under reconstruction. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1200) is implemented in software instructions, thus when the processing circuitry executes the software instructions, the processing circuitry performs the process (1200). The process starts at (S1201) and proceeds to (S1210).

At (S1210), prediction information of a current block in a current picture is decoded. The prediction information is indicative of a prediction mode that is based on a motion vector candidate list. In addition, grid size information (e.g., gridX and gridY) can be predefined for the encoder and the decoder, or signaled at SPS, PSS or Slice header. A maximum search round value (e.g., N) can also be predefined or signaled in the SPS, PSS or Slice header.

At (S1220), the current block is expanded to an expanded block by increasing the width with gridX and increasing the height with gridY. It is noted that in the first extension round, the current block is expanded. Then starting from the second extension round, the expanded block is further expanded by gridX horizontally and by gridY vertically, respectively. The expanded block can be placed around the center of the current block or around the top left corner of the current block.

At (S1230), after each extension round, the search of new motion vector candidates can be performed. New motion vector candidates can be located according to the position of the top left corner of the expanded block, the newWidth, and the newHeight of the expanded block.

In an embodiment, the position of the top left block of the expanded block can be calculated as $(S_x-L_x, S_y-L_y)$, wherein $L_x$ and $L_y$ are the width size and height size of a motion vector candidate, respectively. The position of the above middle block of the expanded block can be calculated as $(S_x+(newWidth>>1), S_y-L_y)$, wherein the >> is a bitwise right shifting operation, which is equivalent to dividing the newWidth by 2. The position of the left middle block of the expanded block can be calculated as $(S_x-L_x, S_y+(newHeight>>1))$, wherein the >> is the bitwise right shifting operation, which is equivalent to dividing the newHeight by 2. The position of the top right block of the expanded block can be obtained by vertically mirroring the top left block of the expanded block along a vertical line across the middle of the expanded block. The position of the bottom left block of the expanded block can be obtained by horizontally mirroring the top left block of the expanded block along a horizontal line across the middle of the expanded block.

In another embodiment, the position of the top left block of the expanded block can be calculated as $(S_x-L_x, S_y-L_y)$, wherein $L_x$ and $L_y$ are the width size and height size of a motion vector candidate, respectively. The position of the above middle block of the expanded block can be calculated as $(S_x+(newWidth>>1)-L_x, S_y-L_y)$, wherein the >> is a bitwise right shifting operation, which is equivalent to dividing the newWidth by 2. The position of the left middle block of the expanded block can be calculated as $(S_x-L_x, S_y+(newHeight>>1)-L_y)$, wherein the >> is the bitwise right shifting operation, which is equivalent to dividing the newHeight by 2. The position of the top right block of the expanded block can be obtained by vertically mirroring the top left block of the expanded block along a vertical line across the middle of the expanded block. The position of the bottom left block of the expanded block can be obtained by horizontally mirroring the top left block of the expanded block along a horizontal line across the middle of the expanded block.

At (S1240), the motion vector candidates, including the adjacent motion vector candidates and the non-adjacent motion vector candidates can be added into the motion vector candidate list. When adding and unifying the adjacent motion vector candidates and the non-adjacent motion vector candidates, temporal motion vector candidates can also be considered in the motion vector candidate list.

In one embodiment, an adjacent temporal motion vector predictor (TMVP) that is in the right bottom location of the current block can be added into the motion vector candidate list. Further, after each block extension round, a new TMVP that is in the right bottom location of the expanded block can also be added into the motion vector candidate list.

In another embodiment, when the TMVP is in another location of the current block, which is not in the right bottom location of the current block, the TMVP can also be added into the motion vector candidate list. After each block extension round, a new TMVP that is in the corresponding location of the expanded block, which is not in the right bottom location of the expanded block, can also be added into the motion vector candidate list.

At (S1250), check if the search range reaches inside a CTU that is left of the current block or a CTU that is above of the current block. If yes, the process (1200) can proceed to (S1260). Otherwise, the process (1200) can proceed to (S1270).

At (S1260), when the search range is inside a CTU that is left of the current block, the position of the motion vector candidate is replaced by either the related position in the right most column of the left CTU, or the related position in the left most column of current CTU is used. When the search range is inside a CTU that is above of the current block, the position of the motion vector candidate is replaced by either the related position in the bottom column of the above CTU, or the related position in the top column of the current CTU is used.

At (S1270), it is checked if the search of new motion vector candidates meets a stop condition. The stop condition can include i) the search round or the extension round reaches a maximum search round value (e.g., MaxSearchRounds); ii) the search range exceeds a last coding tree unit (CTU) row that is above the current block; or iii) the search range exceeds a maximum search range (e.g., MaxSearchRange). If yes, the process (1200) can then proceed to (S1299) and terminates. IF no, the process (1200) can then proceed to (S1220) and continue.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
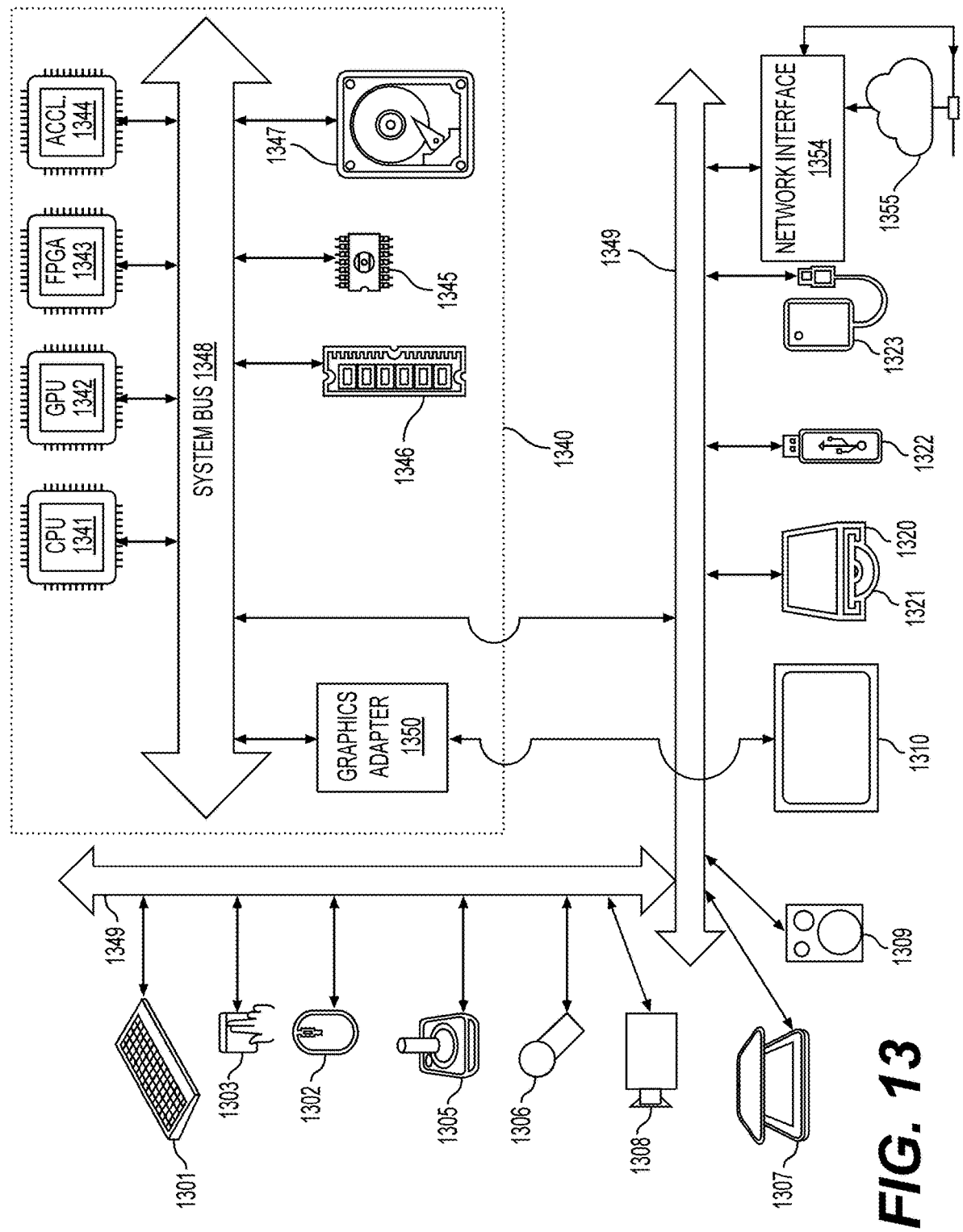
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A

Acronyms

| | |
|---|---|
| JEM: | joint exploration model |
| VVC: | versatile video coding |
| BMS: | benchmark set |
| MV: | Motion Vector |
| HEVC: | High Efficiency Video Coding |
| SEI: | Supplementary Enhancement Information |
| VUI: | Video Usability Information |
| GOPs: | Groups of Pictures |
| TUs: | Transform Units, |
| PUs: | Prediction Units |
| CTUs: | Coding Tree Units |
| CTBs: | Coding Tree Blocks |
| PBs: | Prediction Blocks |
| HRD: | Hypothetical Reference Decoder |
| SNR: | Signal Noise Ratio |
| CPUs: | Central Processing Units |
| GPUs: | Graphics Processing Units |
| CRT: | Cathode Ray Tube |
| LCD: | Liquid-Crystal Display |
| OLED: | Organic Light-Emitting Diode |
| CD: | Compact Disc |
| DVD: | Digital Video Disc |
| ROM: | Read-Only Memory |
| RAM: | Random Access Memory |
| ASIC: | Application-Specific Integrated Circuit |
| PLD: | Programmable Logic Device |
| LAN: | Local Area Network |
| GSM: | Global System for Mobile communications |
| LTE: | Long-Term Evolution |
| CANBus: | Controller Area Network Bus |
| USB: | Universal Serial Bus |
| PCI: | Peripheral Component Interconnect |
| FPGA: | Field Programmable Gate Areas |
| SSD: | solid-state drive |
| IC: | Integrated Circuit |
| CU: | Coding Unit |

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding prediction information for a current block in a current picture from a coded video bitstream, the prediction information being indicative of a prediction mode that is based on an expanded motion vector candidate list;
expanding the current block to generate an expanded block by:
 (i) calculating a new width of the expanded block based on a location of the current block and a first grid size,
 (ii) calculating a new height of the expanded block based on the location of the current block and a second grid size, and
 (iii) iteratively (a) increasing a width of the current block in accordance with the calculated new width and (b) increasing a height of the current block in accordance with the calculated new height until a number of iterations is equal to a maximum search round value;
searching and locating, in the expanded block, a plurality of blocks including a top left block, an above middle block, a top right block, a left middle block, and a bottom left block that are not adjacent to neighboring blocks of the current block; and
constructing, in response to the prediction mode, the expanded motion vector candidate list that includes at least an adjacent motion vector candidate associated with an adjacent neighboring block of the current block and a non-adjacent motion vector candidate associated with a block from the plurality of blocks located in the expanded block that is non-adjacent to the current block.

2. The method of claim 1, further comprising:
expanding an adjacent temporal motion vector predictor (TMVP) of the current block to a non-adjacent TMVP of the expanded block;
adding, in the expanded motion vector candidate list, the non-adjacent TMVP that is in a right bottom location of the expanded block when the adjacent TMVP is in the right bottom location of the current block; and
adding, in the expanded motion vector candidate list, the non-adjacent TMVP that is not in the right bottom location of the expanded block when the adjacent TMVP is not in the right bottom location of the current block.

3. The method of claim 1, wherein the expanding the current block to generate the expanded block further comprises:
obtaining the maximum search round value that is predefined or signaled in a Sequence Parameter Set (SPS), a Picture Parameter Set (PPS) or Slice header; and
obtaining searching grid information that is defined by an encoder and a decoder, or signaled in a SPS, a PPS or Slice header, wherein the search grid information includes the first grid size and the second grid size.

4. The method of claim 1, wherein the calculated new width is newWidth and the calculated new height is newHeight, and wherein the searching and locating of the plurality of blocks in the expanded block, further comprises:
obtaining a maximum search range value that is defined in a macro or signaled in a Sequence Parameter Set (SPS), a Picture Parameter Set (PPS) or Slice header;
searching the plurality of blocks for the adjacent motion vector candidate and the non-adjacent motion vector candidate in a same order for the blocks on a left side of the current block and for the blocks on an above side of the current block;
locating a coordinate of a top left of the expanded block as $(S_x, S_y)$ based on the location of the current block, the first grid size, and the second grid size;
locating the top left block of the expanded block as $(S_x-L_x, S_y-L_y)$, wherein $L_x$ and $L_y$ are a respective width size and height size of a candidate block;
locating the above middle block of the expanded block as $(S_x+(\text{newWidth}\gg 1), S_y-L_y)$ or $(S_x+(\text{newWidth}\gg 1)-L_x, S_y-L_y)$, wherein the $\gg$ is a bitwise right shifting operation;
locating the left middle block of the expanded block as $(S_x-L_x, S_y+(\text{newHeiaht}\gg 1))$ or $(S_x-L_x, S_y+(\text{newHeight}\gg 1)-L_y)$, wherein the $\gg$ is a bitwise right shifting operation;
locating the top right block of the expanded block by vertically mirroring the top left block of the expanded block along a vertical line across a middle of the expanded block; and
locating the bottom left block of the expanded block by horizontally mirroring the top left block of the expanded block along a horizontal line across the middle of the expanded block.

5. The method of claim 3, wherein the calculating the new width of the expanded block and the new height of the expanded block further comprises:

calculating a first offset of the expanded block and a second offset of the expanded block by positioning the expanded block around a center of the current block; or calculating the first offset of the expanded block and the second offset of the expanded block by positioning the expanded block around a top left corner of the current block.

6. The method of claim 1, wherein the searching and locating of the plurality of blocks in the expanded block, further comprises stopping searching and locating a block for the expanded motion vector candidate list when:

a search round exceeds the maximum search round value;

a search range exceeds a last coding tree unit (CTU) row that is above the current block;

the search range exceeds a maximum search range value;

the search range reaches inside a CTU that is left of a current CTU where the current block is located; or the search range reaches inside a CTU that is above of the current CTU where the current block is located.

7. The method of claim 6, wherein the stopping searching and locating of the block for the expanded motion vector candidate list when the search range exceeds a last coding tree unit (CTU) row that is above the current block, further comprises using motion vector data stored in the last CTU row that is above the current block for searching and locating the block for the expanded motion vector candidate list.

8. The method of claim 6, wherein the stopping searching and locating of the block for the expanded motion vector candidate list, further comprises:

replacing, when the search range reaches inside the CTU that is left of the current CTU where the current block is located, the location of the block for the expanded motion vector candidate list by a location in a rightmost column of the left CTU or a location in a leftmost column of the current CTU; and replacing, when the search range reaches inside the CTU that is above of the current CTU where the current block is located, the location of the block for the expanded motion vector candidate list by a location in a bottom column of the left CTU or a location in a top column of the current CTU.

9. An apparatus for video decoding, comprising:

processing circuitry configured to:

decode prediction information for a current block in a current picture from a coded video bitstream, the prediction information being indicative of a prediction mode that is based on an expanded motion vector candidate list;

expand the current block to generate an expanded block by:

(i) calculation of a new width of the expanded block based on a location of the current block and a first grid size, (ii) calculation of a new height of the expanded block based on the location of the current block and a second grid size, and (iii) iteratively increase a width of the current block in accordance with the calculated new width and increase a height of the current block in accordance with the calculated new height until a number of iterations is equal to a maximum search round value;

search and locate, in the expanded block, a plurality of blocks including a top left block, an above middle block, a top right block, a left middle block, and a bottom left block that are not adjacent to neighboring blocks of the current block; and construct, in response to the prediction mode, the expanded motion vector candidate list that includes at least an adjacent motion vector candidate associated with an adjacent neighboring block of the current block and a non-adjacent motion vector candidate associated with a block from the plurality of blocks located in the expanded block that is non-adjacent to the current block.

10. The apparatus of claim 9, wherein the processing circuitry is further configured to:

expand an adjacent temporal motion vector predictor (TMVP) of the current block to a non-adjacent TMVP of the expanded block;

add, in the expanded motion vector candidate list, the non-adjacent TMVP that is in a right bottom location of the expanded block when the adjacent TMVP is in the right bottom location of the current block; and add, in the expanded motion vector candidate list, the non-adjacent TMVP that is not in the right bottom location of the expanded block when the adjacent TMVP is not in the right bottom location of the current block.

11. The apparatus of claim 9, wherein the processing circuitry is further configured to:

obtain the maximum search round value that is predefined or signaled in a Sequence Parameter Set (SPS), a Picture Parameter Set (PPS) or Slice header; and obtain searching grid information that is defined by an encoder and a decoder, or signaled in a SPS, a PPS or Slice header, wherein the search grid information includes the first grid size and the second grid size.

12. The apparatus of claim 9, wherein the calculated new width is newWidth and the calculated new height is newHeight, and wherein the processing circuitry is further configured to:

obtain a maximum search range value that is defined in a macro or signaled in a Sequence Parameter Set (SPS), a Picture Parameter Set (PPS) or Slice header;

search the plurality of blocks for the adjacent motion vector candidate and the non-adjacent motion vector candidate in a same order for the blocks on a left side of the current block and for the blocks on an above side of the current block;

locate a coordinate of a top left of the expanded block as $(S_x, S_y)$ based on the location of the current block, the first grid size, and the second grid size;

locate the top left block of the expanded block as $(S_x-L_x, S_y-L_y)$, wherein $L_x$ and $L_y$ are a respective width size and height size of a candidate block;

locate the above middle block of the expanded block as $(S_x+(newWidth>>1), S_y-L_y)$ or $(S_x+(newWidth>>1)-L_x, S_y-L_y)$, wherein the >> is a bitwise right shifting operation;

locate the left middle block of the expanded block as $(S_x-L_x, S_y+(newHeight>>1))$ or $(S_x-L_x, S_y+(newHeight>>1)-L_y)$, wherein the >> is a bitwise right shifting operation;

locate the top right block of the expanded block by vertically mirroring the top left block of the expanded block along a vertical line across a middle of the expanded block; and locate the bottom left block of the expanded block by horizontally mirroring the top left block of the expanded block along a horizontal line across the middle of the expanded block.

13. The apparatus of claim 11, wherein the processing circuitry is further configured to:
calculate a first offset of the expanded block and a second offset of the expanded block by positioning the expanded block around a center of the current block; or
calculate the first offset of the expanded block and the second offset of the expanded block by positioning the expanded block around a top left corner of the current block.

14. The apparatus of claim 9, wherein the processing circuitry is further configured to stop searching and locating a block for the expanded motion vector candidate list when:
a search round exceeds the maximum search round value;
a search range exceeds a last coding tree unit (CTU) row that is above the current block;
the search range exceeds a maximum search range value:
the search range reaches inside a CTU that is left of a current CTU where the current block is located; or
the search range reaches inside a CTU that is above of the current CTU where the current block is located.

15. The apparatus of claim 14, wherein the processing circuitry, when the search range exceeds a last CTU row that is above the current block, is further configured to use motion vector data stored in the last CTU row that is above the current block for searching and locating the block for the expanded motion vector candidate list.

16. The apparatus of claim 14, wherein the processing circuitry is further configured to:
replace, when the search range reaches inside the CTU that is left of the current CTU where the current block is located, the location of the block for the expanded motion vector candidate list by a location in a rightmost column of the left CTU or a location in a leftmost column of the current CTU; and
replace, when the search range reaches inside the CTU that is above of the current CTU where the current block is located, the location of the block for the expanded motion vector candidate list by a location in a bottom column of the above CTU or a location in a top column of the current CTU.

17. A non-transitory computer-readable medium having instructions stored therein, which when executed by a computer for video decoding, cause the computer to perform:
decoding prediction information for a current block in a current picture from a coded video bitstream, the prediction information being indicative of a prediction mode that is based on an expanded motion vector candidate list;
expanding the current block to generate an expanded block by:
(i) calculating a new width of the expanded block based on a location of the current block and a first grid size,
(ii) calculating a new height of the expanded block based on the location of the current block and a second grid size, and
(iii) iteratively (a) increasing a width of the current block in accordance with the calculated new width and (b) increasing a height of the current block in accordance with the calculated new height until a number of iterations is equal to a maximum search round value;
searching and locating, in the expanded block, a plurality of blocks including a top left block, an above middle block, a top right block, a left middle block, and a bottom left block that are not adjacent to neighboring blocks of the current block; and
constructing, in response to the prediction mode, the expanded motion vector candidate list that includes at least an adjacent motion vector candidate associated with an adjacent neighboring block of the current block and a non-adjacent motion vector candidate associated with a block from the plurality of blocks located in the expanded block that is non-adjacent to the current block.

18. The non-transitory computer-readable medium of claim 17, wherein the instructions further cause the computer to perform:
expanding an adjacent temporal motion vector predictor (TMVP) of the current block to a non-adjacent TMVP of the expanded block;
adding, in the expanded motion vector candidate list, the non-adjacent TMVP that is in a right bottom location of the expanded block when the adjacent TMVP is in the right bottom location of the current block; and
adding, in the expanded motion vector candidate list, the non-adjacent TMVP that is not in the right bottom location of the expanded block when the adjacent TMVP is not in the right bottom location of the current block.

19. The non-transitory computer-readable medium of claim 17, wherein the instructions further cause the computer to perform:
obtaining the maximum search round value that is predefined or signaled in a Sequence Parameter Set (SPS), a Picture Parameter Set (PPS) or Slice header; and
obtaining searching grid information that is defined by an encoder and a decoder, or signaled in a SPS, a PPS or Slice header, wherein the search grid information includes the first grid size and the second grid size.

20. The non-transitory computer-readable medium of claim 17, wherein the calculated new width is newWidth and the calculated new height is newHeight, and wherein the instructions further cause the computer to perform:
obtaining a maximum search range value that is defined in a macro or signaled in a Sequence Parameter Set (SPS), a Picture Parameter Set (PPS) or Slice header;
searching the plurality of blocks for the adjacent motion vector candidate and the non-adjacent motion vector candidate in a same order for the blocks on a left side of the current block and for the blocks on an above side of the current block;
locating a coordinate of a top left of the expanded block as $(S_x, S_y)$ based on the location of the current block, the first grid size, and the second grid size;
locating the top left block of the expanded block as $(S_x-L_x, S_y-L_y)$, wherein $L_x$ and $L_y$ are a respective width size and height size of a candidate block;
locating the above middle block of the expanded block as $(S_x+(newWidth>>1), S_y-L_y)$ or $(S_x+(newWidth>>1)-L_x, S_y-L_y)$, wherein the >> is a bitwise right shifting operation;
locating the left middle block of the expanded block as $(S_x-L_x, S_y+(newHeight>>1))$ or $(S_x-L_x, S_y+(newHeight>>1)-L_y)$, wherein the >> is a bitwise right shifting operation;
locating the top right block of the expanded block by vertically mirroring the top left block of the expanded block along a vertical line across a middle of the expanded block; and locating the bottom left block of the expanded block by horizontally mirroring the top left block of the expanded block along a horizontal line across the middle of the expanded block.

21. The non-transitory computer-readable medium of claim 17, wherein the instructions further cause the computer to perform stop searching and locating a block for the expanded motion vector candidate list when:
- a search round exceeds the maximum search round value;
- a search range exceeds a last coding tree unit (CTU) row that is above the current block;
- the search range exceeds a maximum search range value;
- the search range reaches inside a CTU that is left of a current CTU where the current block is located; or
- the search range reaches inside a CTU that is above of the current CTU where the current block is located.

22. The non-transitory computer-readable medium of claim 21, when the search range exceeds a last CTU row that is above the current block, the instructions further cause the computer to use motion vector data stored in the last CTU row that is above the current block for searching and locating the block for the expanded motion vector candidate list.

23. The non-transitory computer-readable medium of claim 21, the instructions further cause the computer to perform:
- replacing, when the search range reaches inside the CTU that is left of the current CTU where the current block is located, the location of the block for the expanded motion vector candidate list by a location in a rightmost column of the left CTU or a location in a leftmost column of the current CTU; and
- replacing, when the search range reaches inside the CTU that is above of the current CTU where the current block is located, the location of the block for the expanded motion vector candidate list by a location in a bottom column of the above CTU or a location in a top column of the current CTU.

* * * * *